(12) United States Patent
Hamatani

(10) Patent No.: US 8,274,680 B2
(45) Date of Patent: Sep. 25, 2012

(54) SERVICE SUPPLIED BY MULTIFUNCTION PERIPHERAL (MFP)

(75) Inventor: Chinami Hamatani, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 920 days.

(21) Appl. No.: 12/138,645

(22) Filed: Jun. 13, 2008

(65) Prior Publication Data

US 2008/0316529 A1    Dec. 25, 2008

(30) Foreign Application Priority Data

Jun. 19, 2007    (JP) ................................ 2007-161820

(51) Int. Cl.
- G06F 3/12    (2006.01)
- G06F 15/00    (2006.01)
- G06K 15/00    (2006.01)

(52) U.S. Cl. ......................... 358/1.15; 358/1.1; 358/1.16
(58) Field of Classification Search ........................ None
See application file for complete search history.

(56) References Cited

U.S. PATENT DOCUMENTS

| | | | | |
|---|---|---|---|---|
| 5,577,172 A * | 11/1996 | Vatland et al. | ............... | 358/1.15 |
| 6,407,823 B1 * | 6/2002 | Aoki | ............... | 358/1.15 |
| 6,456,388 B1 * | 9/2002 | Inoue et al. | .................. | 358/1.15 |
| 6,795,207 B1 * | 9/2004 | Bates et al. | .................. | 358/1.15 |
| 6,968,150 B2 * | 11/2005 | Ferlitsch | ....................... | 399/403 |
| 7,154,616 B2 * | 12/2006 | Watanabe et al. | ............ | 358/1.13 |
| 7,184,159 B2 * | 2/2007 | Bergstrand | ................... | 358/1.15 |
| 7,187,459 B2 * | 3/2007 | Chiba et al. | ................... | 358/1.13 |
| 7,333,230 B2 * | 2/2008 | Sugishita et al. | ............ | 358/1.15 |
| 7,349,109 B2 * | 3/2008 | Sugishita | ....................... | 358/1.13 |
| 7,380,243 B2 * | 5/2008 | Sugishita et al. | ............. | 717/168 |
| 7,394,560 B2 * | 7/2008 | Tonegawa | ..................... | 358/1.15 |
| 7,460,253 B2 * | 12/2008 | Osada | ......................... | 358/1.13 |
| 7,773,237 B2 * | 8/2010 | Takeuchi | ....................... | 358/1.1 |
| 7,787,158 B2 * | 8/2010 | Matsuda | ....................... | 358/462 |
| 2004/0019580 A1 * | 1/2004 | Bergstrand | ....................... | 707/1 |
| 2004/0061886 A1 * | 4/2004 | Sato et al. | ..................... | 358/1.13 |
| 2004/0080779 A1 * | 4/2004 | Kawamoto | .................. | 358/1.14 |
| 2004/0109188 A1 * | 6/2004 | Akiyoshi et al. | ............. | 358/1.13 |
| 2005/0200889 A1 * | 9/2005 | Oomura | ........................ | 358/1.15 |
| 2006/0143698 A1 * | 6/2006 | Ohara | ............................ | 726/10 |
| 2006/0164677 A1 * | 7/2006 | Ahn | ............................ | 358/1.15 |
| 2006/0215221 A1 | 9/2006 | Suzuki et al. | | |
| 2006/0221368 A1 * | 10/2006 | Higuchi | ........................ | 358/1.13 |
| 2006/0279781 A1 * | 12/2006 | Kaneko | ........................ | 358/1.15 |
| 2007/0024901 A1 * | 2/2007 | Kayama | ........................ | 358/1.15 |
| 2007/0285709 A1 * | 12/2007 | Yamasaki et al. | ............ | 358/1.15 |

FOREIGN PATENT DOCUMENTS

JP    2001243075 A    9/2001

(Continued)

*Primary Examiner* — Hilina S Kassa
(74) *Attorney, Agent, or Firm* — Roy W. Truelson

(57) ABSTRACT

To provide an optimal service matched with requests from users of a MFP connected with a network. A method for providing a service by a multifunction peripheral (MFP) 10 includes the steps of: receiving a request for the service; receiving information 90 required for executing the service from an external device 30 capable of communicating with the MFP; judging, based on the received information 90, whether the MFP 10 itself executes processing for providing the service or the external device 30 executes the processing (50); and if the MFP itself executes the processing and if the MFP does not have an application required for the execution, downloading the application 100 from the external device.

13 Claims, 3 Drawing Sheets

FOREIGN PATENT DOCUMENTS

| | | |
|---|---|---|
| JP | 2001268306 A | 9/2001 |
| JP | 2004363934 A | 12/2004 |
| JP | 2005144764 A | 6/2005 |
| JP | 2005151010 A | 6/2005 |
| JP | 2006085406 A | 3/2006 |
| JP | 2006085620 A | 3/2006 |
| JP | 2006163543 A | 6/2006 |
| JP | 2006246181 A | 9/2006 |
| JP | 2006-319974 | 11/2006 |
| JP | 2007060556 A | 3/2007 |

* cited by examiner

SERVICE SUPPLIED BY MULTIFUNCTION PERIPHERAL (MFP)

FIELD OF THE INVENTION

The present invention relates to a multifunction peripheral (MFP). More particularly, the present invention relates to provide various services by using a multifunction peripheral (MFP) connected with a network.

BACKGROUND OF THE INVENTION

Along with the necessity of the integration with IT environment or the trend toward more and more functions, multifunction peripherals (MFPs) installed at offices, for example, have been required to work in cooperation with external services as required in PCs and servers. However, since MFPs are so-called built-in type equipment with available functions built therein beforehand, they tend to be fundamentally restricted in their functions as compared with PCs and servers. Furthermore, it is difficult to decide beforehand what functions are to be incorporated in a MFP or how the MFP should work in cooperation with external services such as Web services. In other words, such a decision significantly depends on the environment where the MFP is actually installed. Moreover, it is difficult to judge the efficiency as to how such services diversified under the environment are to be offered. Although it is expected that the integration with the IT environment leads to the effective management of MFPs in a similar manner to conventional IT resources such as a server, it will be difficult to realize the virtualization as already provided in a storage area, for example, because of the complexity of services provided by the MFPs.

Even in conventional MFPs, there is a method (solution) in which a certain function is implemented in a disabled state beforehand as an option, and then such a function is enabled by some kind of mechanism. There is another solution using Java platform that allows Java applications externally created to be added on demand. However, there has been no exactly optimal solution provided for achieving on-demand functions with consideration given to the utilization of Web services in the future.

As a solution closer to the effective virtual cooperation of MFPs, some software products working in cooperation with certain types of printers are available, which enable the data subjected to print processing once to be stored in a server different from the printer and to be output again insofar as they are in the same model. These software products, however, are for merely adjusting the data subjected to the processing, and does not have a function allowing the devices to share the processing in cooperation with each other. It is also impossible for the devices to share the data halfway through the processing.

Japanese Unexamined Patent Publication (Kokai) No. 2006-319974 describes to select an optimal server for rendering data printable with a printer. The method of this patent publication, however, is for selecting an optimal server (execution CPU) depending on the loading status or the like, so to speak, applies the existing concept of grid-computing directly to the rendering, and does not disclose the technology for providing an optimal service in response to various requests in MFPs.

SUMMARY OF THE INVENTION

The present invention provides users of a MFP with services in response to their diversified requests.

The present invention also provides an optimal service matched with requests from users of a MFP connected with a network.

According to the present invention, a method for providing a service by a multifunction peripheral (MFP) is provided. The method includes the steps of: receiving a request for the service; receiving information required for executing the service from an external device capable of communicating with the MFP; judging, based on the received information, whether the MFP itself executes processing for providing the service or the external device executes the processing; and if the MFP itself executes the processing and if the MFP does not have an application required for the execution, downloading the application from the external device.

According to the present invention, a multifunction peripheral (MFP) for providing a user with various services is provided. The multifunction peripheral (MFP) includes: a memory that stores information sent from an external device; a logic for receiving the information from the memory and for judging, based on the information, whether the MFP itself executes processing for providing a service or the external device executes the processing; and a processing device for executing the processing for providing a service.

A MFP of the present invention enables to select necessary functions (solutions) from functions of the MFP and functions of external devices connected with the MFP to provide an optimal service matched with requests from users.

DETAILED DESCRIPTION OF THE INVENTION

Figure 1:
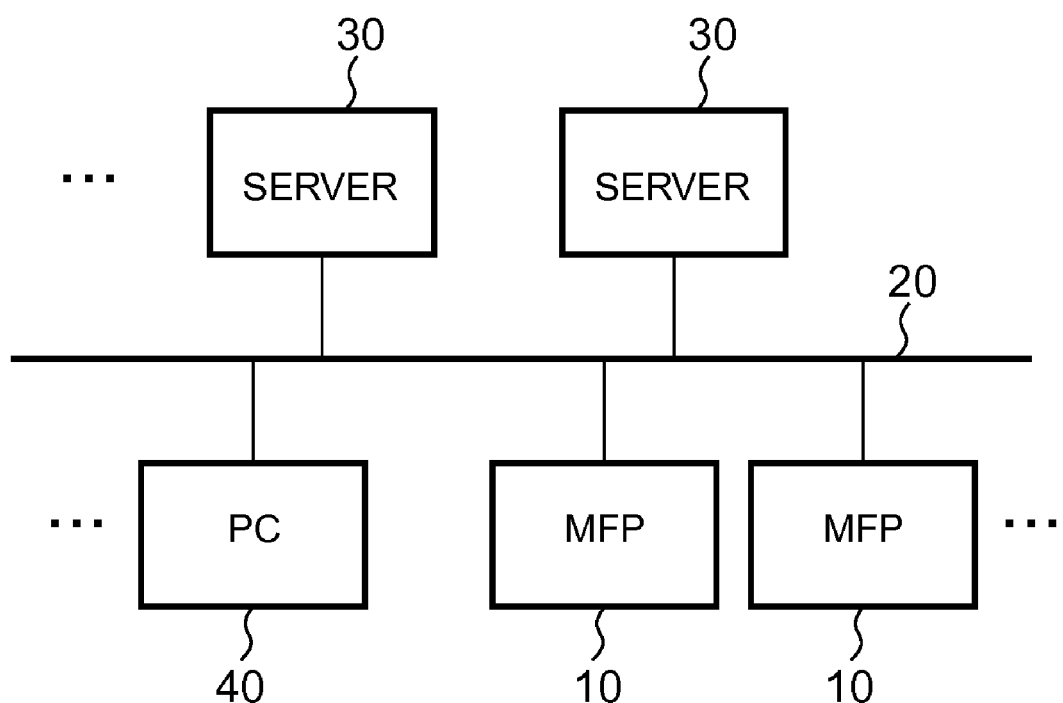
FIG. 1 shows the network as a whole including a MFP of the present invention.

The following describes the present invention in detail with reference to the drawings. FIG. 1 shows the network as a whole including a MFP of the present invention. At least one MFP 10 is connected with a server 30 via a communications network 20. A MFP 10 includes various types of peripherals having at least two functions such as a printer, a facsimile, a copying machine, and a scanner. In general, the communications network 20 is an in-house LAN, which is not a limiting-example, and may be another form of communications network. The LAN may be wired or wireless. A "service" disclosed here refers to the service itself or an application (software) for providing the service.

The server 30 is installed at any place of in an office, in a building where the office is located or at a remote place connected via an external communications network. One or more servers 30 are installed depending on the purpose. A plurality of personal computers (PCs) 40 may be connected with the communications network 20 as users' terminals. The PCs 40 include various devices such as desktop-type and portable PCs, and cellphones. It should be noted that although FIG. 1 illustrates an example of the servers 30 used as the external devices, they may be devices other than servers, for example, may be other MFPs and PCs. Service requests from users to the MFP 10 may be input directly to the MFP 10 or may be input to the MFP 10 via the network through the PCs 40.

In the illustrated configuration of FIG. 1, the features of the present invention are as follows:
a) in the MFP 10, to use a service provided by the server 30 remotely, to capture the service therein for use, and to perform processing inside the MFP are selected in accordance with the judgment for an optimal form of usage;

b) when a service is provided by the server 30, data required for judging the optimal usage form of (a) is provided to the MFP 10 together with the service itself; and c) the MFP 10 itself also is provided with a function (interface) for providing a service in order to play a role of providing a service as an external device.

Figure 2:
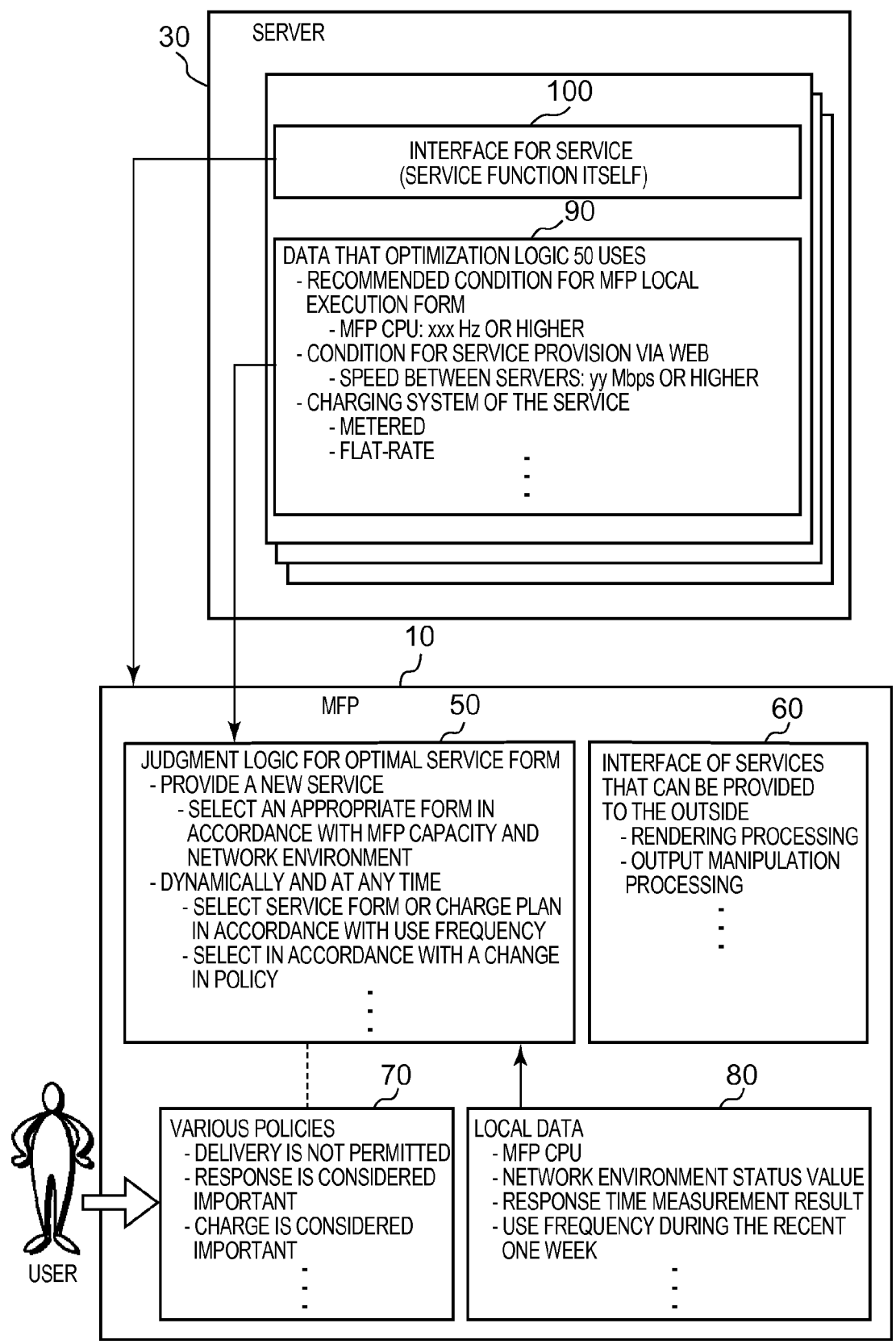
FIG. 2 shows the features of the present invention.

FIG. 2 schematically shows the above-described features of the present invention. The MFP 10 includes a judgment logic 50 for an optimal service form, an interface 60 of a service that can provided to the outside, various policies 70, and local data 80. The judgment logic 50 makes a judgment for selecting an optimal service form in accordance with a service request from a user. For instance, a judgment is made as to whether the processing for providing the service is to be executed by the MFP 10 itself or by the external server 30. At the time of the judgment, the various policies 70 and the local data 80 inside the MFP 10 as well as data 90 sent from the server 30 are used as the judgment criteria (information). At least one piece of the information for judgment is selected and utilized arbitrarily depending on the service contents, for example.

When the server 30 executes the processing, the judgment logic 50 sends to the server 30 an instruction for urging to execute the processing. The processing by the judgment logic 50 actually is executed by a CPU (not illustrated) provided in the MFP 10. The various policies 70 and the local data 80 are stored in a memory (not illustrated) including a HDD or the like provided in the MFP 10. More specifically, when a new service is provided to a user, the judgment logic 50 considers the performance of the MFP 10 and selects an optimal service form in accordance with the network environment. Thereafter, the judgment logic 50 reconsiders or selects again the service form, or selects a charge plan for providing the service with consideration given to the use frequency of the service by the user. It is desired that every MFP 10 is provided with the judgment logic 50 as a base function irrespective of the types of the MFPs 10.

The various policies 70 include "delivery is not permitted", "response speed is considered important", and "charge is considered important", for example. Such policies can be set or selected by a user arbitrarily. The local data 80 includes the CPU capacity of the MFP 10 (specifications), the environment conditions of the network (e.g., loading status), a measurement result of the response time, and the use frequency during a certain time period (e.g., one week), for example. The local data also can be set or selected arbitrarily. The local data varies among the kinds of MFPs, and is updated automatically at an appropriate timing. Services that the interface 60 can provide include rendering processing, output manipulation processing, storage processing in a storage device (e.g., HDD), and the like. In order to provide a service cooperatively by the MFP 10 (to realize a virtualized service), the MFP 10 makes the interface 60 specify the "atomic" service provided thereby, which is then open to the public. The above-stated image processing (rendering processing) service, sheet output service, or the like corresponds to the atomic service.

The server 30 serving as an external device contains the data 90 that the judgment logic 50 of the MFP 10 uses for judgment and an interface for service (service function) 100. The data 90 contains conditions required for executing a service, i.e., for executing an application for providing the service (e.g., CPU capacity (specifications) of the MFP 10), conditions for providing a service via a network (Web) (e.g., a data transmission speed between the server 30 and the MFP 10), and a charging system of a service (e.g., metered or flat-rate). The data 90 is transmitted from the server 30 to the MFP 10 in response to a request from the MFP 10.

The interface (service function) 100 contains various services (applications) that the server can provide. Such services may be executed by the server 30 itself or may be downloaded from the server and executed by the MFP 10. In accordance with the instruction sent from the MFP 10 to urge the execution of the processing of the service, the server 30 performs the processing of the service. More specifically, the server 30 selects an application for the service and executes the application. The data 90 and the service function (application) 100 are stored in a memory (e.g., HDD) in the server.

Figure 3:
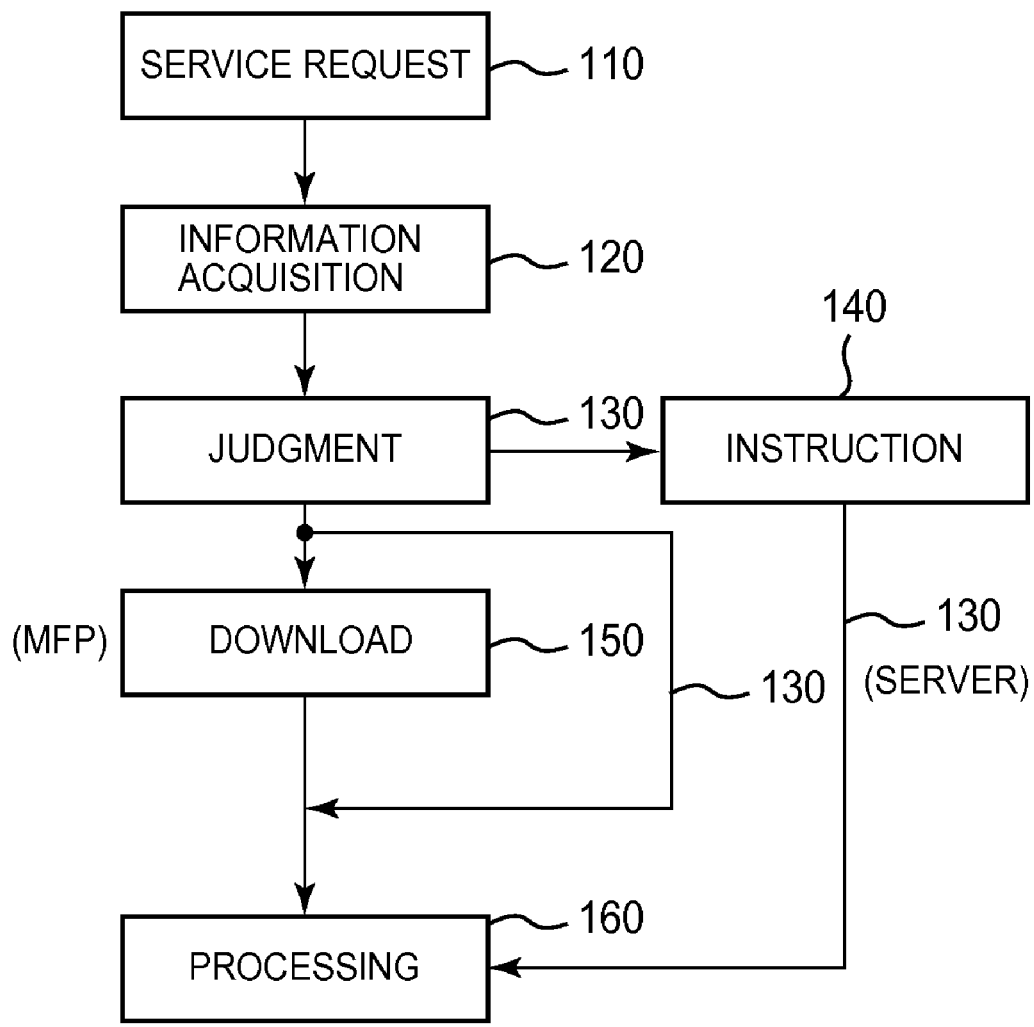
FIG. 3 is a flowchart of the process of the present invention.

FIG. 3 is a flowchart of the processing of the present invention. The MFP 10 receives a service request 10. The MFP 10 acquires information such as local data 80 inside the MFP and data 90 inside the server 30 (120). The judgment logic 50 of the MFP 10 judges, based on the acquired information, as to whether the processing for providing a service is to be executed by the MFP 10 itself or by the server 30 (130). At the time of the judgment, as stated above, at least one piece of information of the various policies 70 and the local data 80 inside the MFP 10 as well as the data 90 sent from the server 30 is utilized as the judgment criteria (information). As a result of the judgment, when the server 30 performs the processing, an instruction 140 therefore is sent to the server 30. In this case, the server 30 selects, in accordance with the instruction 140, a required application among their own applications and executes the processing (160). If the MFP 10 itself executes the processing and the MFP 10 does not have an application required for the execution, the MFP 10 downloads the application from the server 30 (150). On the other hand, if the MFP 10 has the application, the MFP 10 executes the processing immediately (160) without downloading the application from the server 30 (130). A result of the processing is output from the MFP 10 or is stored in a predetermined storage device in accordance with the contents of the service or the user's request, for example. The output form may be selected arbitrarily.

The following describes the processing in which, with respect to normal processing by the MFP 10 of "storing scanned document", a user issues a request "to perform OCR processing prior to the storage" as one example. Assume that a service of receiving image data as an input, performing OCR processing thereto and returning the output thereof has been registered in the server 30. The following data (conditions) are registered in the server 30 in association with this service as the data 90 that the judgment logic 50 of the MFP 10 uses.

a) the service can be used both in Web service and in Java bundle;

b) a threshold value of cost based on charging data in each usage form;

For instance, if the service depends on the use times, it will be cheaper when the service is downloaded from the server 30, which is then executed by the MFP 10 depending on the use frequency, and therefore the threshold value of cost is set for such a judgment, and c) the CPU capacity of the MFP required when the service is downloaded from the server 30 as a Java bundle, and the processing is performed by the MFP 10.

If the MFP 10 has a corresponding application, the judgment logic 50 of the MFP 10 uses it. On the other hand, if the MFP 10 does not have such an application, the judgment logic 50 determines as to whether remote processing is performed by the server or the application is downloaded from the server 30 as a Java bundle and the MFP itself processes it based on the data of the above-stated (a) to (c) as well as the local data 80. For instance, if the CPU capacity of the MFP barely corresponds to the required CPU capacity sent from the server (in this case, there is a high possibility that the conditions will not be satisfied unless a CPU usage ratio is at a relatively low level) and if the actual value of the use frequency at the present moment is zero, it is determined that the remote processing is performed by the server.

The following describes the case where the processing of storing scan data fails because of resource shortage of the HDD as one example. In this case, another MFP or "HDD storage service by server" provided by an external file server may be utilized. In the case of this service, since only the remote execution by the server is effective as the usage form because of the nature of this service, the judgment logic 50 of the MFP 10 does not make a judgment based on other local data 80 of the MFP but immediately makes a decision.

As for a method of the present invention, various implementation forms can be considered including the definition of an interface, and for example, to implement a service interface performed remotely, SOAP/UDDI (registry for protocol/service retrieval relating to an external service utilization based on XML) can be used. To implement a delivered application, a bundle form based on SMF of Java (the framework dynamically adding and managing a service on Java) can be used, for example. As variations for the implementation, a server application in enterprise environment may be allowed to include the judgment logic 50 of FIG. 2 and external services to realize uniform management. This is an example utilizing a system management and autonomic environment provided by Tivoli (system management software by IBM) or the like.

The present invention has been described as above with reference to the drawings. However, the present invention is not limited to these embodiments. It will be appreciated for a person skilled in the art that the above-stated embodiments can be modified without departing from the spirit or essential characteristics of the present invention.

What is claimed is:

1. A method for providing a user service for a user by a multifunction peripheral (MFP), comprising the steps of:
   receiving a request in said MFP for the user service;
   receiving specification information in said MFP from an external device capable of communicating with the MFP, said specification information specifying at least one parameter of service processing provided by the external device, said service processing being processing executable by the external device as well as by the MFP and required for providing the user service;
   responsive to receiving the request for the user service, automatically determining within the MFP, based on the received specification information, whether the MFP itself executes service processing required for providing the user service or the external device executes the service processing;
   responsive to automatically determining within the MFP that the external device executes the service processing, automatically sending an instruction from the MFP to the external device requesting execution of the service processing; and
   responsive to automatically determining within the MFP that the MFP itself executes the service processing, if the MFP does not have an application required for the execution of the service processing, automatically requesting downloading the application from an external source, the application being executable on the MFP.

2. The method according to claim 1,
   wherein the step of automatically determining within the MFP, based on the received specification information, whether the MFP itself executes service processing required for providing the user service or the external device executes the service processing is made based on either of or both of local data and a policy for executing the processing included in the MFP.

3. The method according to claim 1,
   wherein the specification information provided by the external device comprises any one of or two or more of required specifications for executing the service processing, communications specifications between the external device and the MFP, and a charging system concerning the service processing.

4. The method according to claim 1, further comprising the step in which, if the external device executes the service processing, the MFP sends to the external device data required for executing the service processing.

5. The method according to claim 1, further comprising the step of, if the MFP itself executes the service processing and if the MFP has an application required for the execution of the service processing, executing the service processing without downloading the application from the external device.

6. A multifunction peripheral (MFP) for providing a user with various user services, comprising:
   a memory that stores specification information sent from an external device, said specification information specifying at least one parameter of service processing provided by the external device, said service processing being required for providing a user service;
   a logic for receiving the specification information from the memory and for, responsive to receiving a request for the user service, determining, based on the specification information, whether the MFP itself executes service processing required for providing the user service or the external device executes the service processing; and
   a processing device for executing the service processing for providing the user service;
   wherein, responsive to the logic determining that the external device executes the service processing, the MFP automatically sends an instruction to the external device requesting execution of the service processing; and
   wherein, responsive to the logic determining that the MFP itself executes the service processing, if the MFP does not have an application required for the execution of the service processing, the MFP automatically requests downloading the application from an external source, the application being executable on the processing device.

7. The MFP according to claim 6,
   wherein the memory stores local data and a policy for executing the service processing, and
   the logic makes the determination based on either of or both of the local data and the policy.

8. The MFP according to claim 6,
   wherein the memory stores an application for executing the service processing, and
   the processing device executes the application received from the memory.

9. The MFP according to claim 6,
   wherein the memory stores an application for executing the service processing, and
   if the external device executes the service processing, the processing device sends the application in the memory to the external device.

10. A program product embodied in a non-transitory computer-readable medium for providing a user with various user services in a multifunction peripheral (MFP), the program product making the MFP execute the following steps of:

receiving specification information from an external device capable of communicating with the MFP, said specification information specifying at least one parameter of service processing provided by the external device, said service processing being processing executable by the external device as well as by the MFP and required for providing a user service;

responsive to receiving a request for the user service, automatically determining, based on the received specification information, whether the MFP itself executes service processing required for providing the user service or the external device executes the service processing;

responsive to automatically determining that the external device executes the service processing, sending an instruction from the MFP to the external device requesting execution of the service processing; and responsive to automatically determining that the MFP itself executes the service processing, if the MFP does not have an application required for the execution of the service processing, requesting downloading the application from an external source, the application being executable on the MFP.

11. The program product according to claim 10, wherein if the external device executes the service processing, the program product further makes the MFP execute the step of sending to the external device data required for executing the service processing.

12. The program product according to claim 10, wherein the external source is said external device.

13. The method according to claim 1, wherein the external source is said external device.

* * * * *